United States Patent
Coyle

(10) Patent No.: US 6,560,341 B1
(45) Date of Patent: May 6, 2003

(54) SYSTEM FOR TRANSCRIPTION AND PLAYBACK OF SONIC SIGNALS

(76) Inventor: Jan R Coyle, 7498 Old Hwy. 395, Carson City, NV (US) 89704

(*) Notice: Subject to any disclaimer, the term of this patent is extended or adjusted under 35 U.S.C. 154(b) by 0 days.

(21) Appl. No.: 08/819,147

(22) Filed: Mar. 17, 1997

Related U.S. Application Data

(63) Continuation-in-part of application No. 07/912,221, filed on Jul. 10, 1992, now Pat. No. 5,621,581, which is a continuation-in-part of application No. 06/854,329, filed on Apr. 21, 1986, now abandoned.

(51) Int. Cl.[7] .................................................. H03G 3/00
(52) U.S. Cl. ........................................ 381/63; 381/61
(58) Field of Search ............................ 381/61, 62, 63, 381/64, 25, 74, 27, 309, 310

(56) References Cited

U.S. PATENT DOCUMENTS

| | | | | |
|---|---|---|---|---|
| 3,221,092 A | * | 11/1965 | Rogers .................... | 381/63 |
| 4,283,600 A | * | 8/1981 | Cohen ..................... | 381/61 |
| 4,408,095 A | * | 10/1983 | Ariga ...................... | 381/27 |
| 4,584,700 A | * | 4/1986 | Scholz ..................... | 381/61 |
| 4,672,671 A | * | 6/1987 | Kennedy ................... | 381/61 |
| 4,683,589 A | * | 7/1987 | Scholz ..................... | 381/61 |
| 4,811,401 A | * | 3/1989 | Brown ..................... | 381/61 |
| 5,307,415 A | * | 4/1994 | Fosgate .................... | 381/27 |

* cited by examiner

Primary Examiner—Minsun Oh Harvey
(74) Attorney, Agent, or Firm—George T. Marcou; Dawn-Marie Bey; Kilpatrick Stockton LLP

(57) ABSTRACT

A system for enhancing sound signals at a relatively high sonic level power input and a comparatively low signal power level output which are relatively adjusted so that the signal is enhanced when reproduced. The input includes a capacitor for creating a reverberation effect in the signal and an adjustable power level varying device for causing a second harmonic effect in the signal. When the system is used in a multichannel sound system, a low pass filter is connected between channels for causing a phantom center channel effect in the sound signal.

1 Claim, 5 Drawing Sheets

SYSTEM FOR TRANSCRIPTION AND PLAYBACK OF SONIC SIGNALS

This application is a continuation-in-part of my application Ser. No. 07/912,221, filed Jul. 10, 1992 now U.S. Pat. No. 5,621,581, which is a continuation-in-part of application Ser. No. 06/854,329, filed Apr. 21, 1986.

BACKGROUND OF THE INVENTION

In the production of recordings of music, lyrics and spoken words and in the transmission of the sonic signals related thereto, efforts have been made to present to a listener as close as possible a representation of the original sound.

In many processes the analog sound signals are digitized and reconverted to analog sound and equipment for playing the sounds and, generally, not capable of producing a true representation of the sonic signals as originally produced in musical presentations or ordinary speech. The equipment frequently, due to wear and other factors affecting ability of to reproduce the sounds is or becomes faulty, and efforts have been made to enhance the sound reproduced in various systems which limit the faithful reproduction of the original sound.

Much effort and development have been expended in the effort to improve the audio equipment including speakers and multichannel reproducing devices so as to distribute the sound waves in ways that are compatible with the sound perceptions of a listening audience.

All of these efforts are directed towards the goal of improving the quality of sound as presented to the listener.

SUMMARY OF THE INVENTION

The present invention is directed towards enabling adjustment of the quality of the sonic signals produced in sound transmission, listening, recording and playback of sonic signals, by adding to the signals desirable characteristics either not played or which improve the sound received by adding reverberation or echo effect, balancing the phase of the signal and adding second harmonics.

This invention in one sense relates to systems for playback, transcription and transformation of sonic signals, and more particularly to systems for transforming sonic signals fed through headphone type output circuit means including means for increasing, maintaining, or decreasing the impedance to such signals received from sonic signal headphone output circuit means and for passing the signals, after adjusting the impedance to them, as necessary, through microphone type input means or recording input circuit means which are included in a playback or record/playback means for sonic signals such as a magnetic tape cassette deck or a video. cassette recorder (VCR) or a compact disc player.

In preferred embodiments, these systems include headphone means that can be linked to the headphone output means of a system for playback and recording of sonic signals. Preferably, such headphone means include means for increasing and/or decreasing the impedance to sonic signals from sonic signal headphone output means. Such increasing/decreasing means is preferably an adjustable potentiometer that can provide at least 200 ohms, preferably at least 5 kilo ohms in resistance to sonic signals from the headphone output means. Such headphone means can also include speaker means to which the sonic signals pass from the potentiometer then pass to sonic signal microphone input means or sonic signal recording input means, either directly from the potentiometer means or from the potentiometer means, via sonic signal headphone speaker means to the microphone input means or recording input means.

In some embodiments, the sonic signal transforming means of this invention is linked, at one end, to the headphone output means for a sonic signal record/playback device such as a magnetic tape cassette deck and, at the other end, to the microphone input means or recording input means or even speaker means such as a magnetic tape playback record means, a VCR or a compact disc player.

In these embodiments,the signal-to-noise ratio of the sonic signals coming from a source such as magnetic tape, a radio, a record player, or compact disc player can be improved by adjusting the means for controlling the sonic signal level output from the system including the headphone output means, and/or by adjusting the means for controlling sonic signal level input to the system including the microphone input means or recording input means.

Preferred embodiments of such systems can permit the sonic signal output level from the headphone output circuit means to be as low as minus 71 decibels and the input level at the microphone input circuit means as high as plus 9 or 10 decibels. By appropriate adjustment of the signal level at the headphone output circuit means, and at the microphone input circuit means or recording input means, signal-to-noise ratio in sonic signals to be played back or transcribed can be substantially improved with substantially no reduction in fidelity or quality.

Preferred embodiments also include systems which are self contained, say in a stereophonic tape or disc player device, or other devices in which self contained systems for enhancement of analog or stereophonic sound is desired.

This invention can be better understood by reference to the drawings, in which.

DESCRIPTION OF THE PREFERRED EMBODIMENTS

Figure 1:
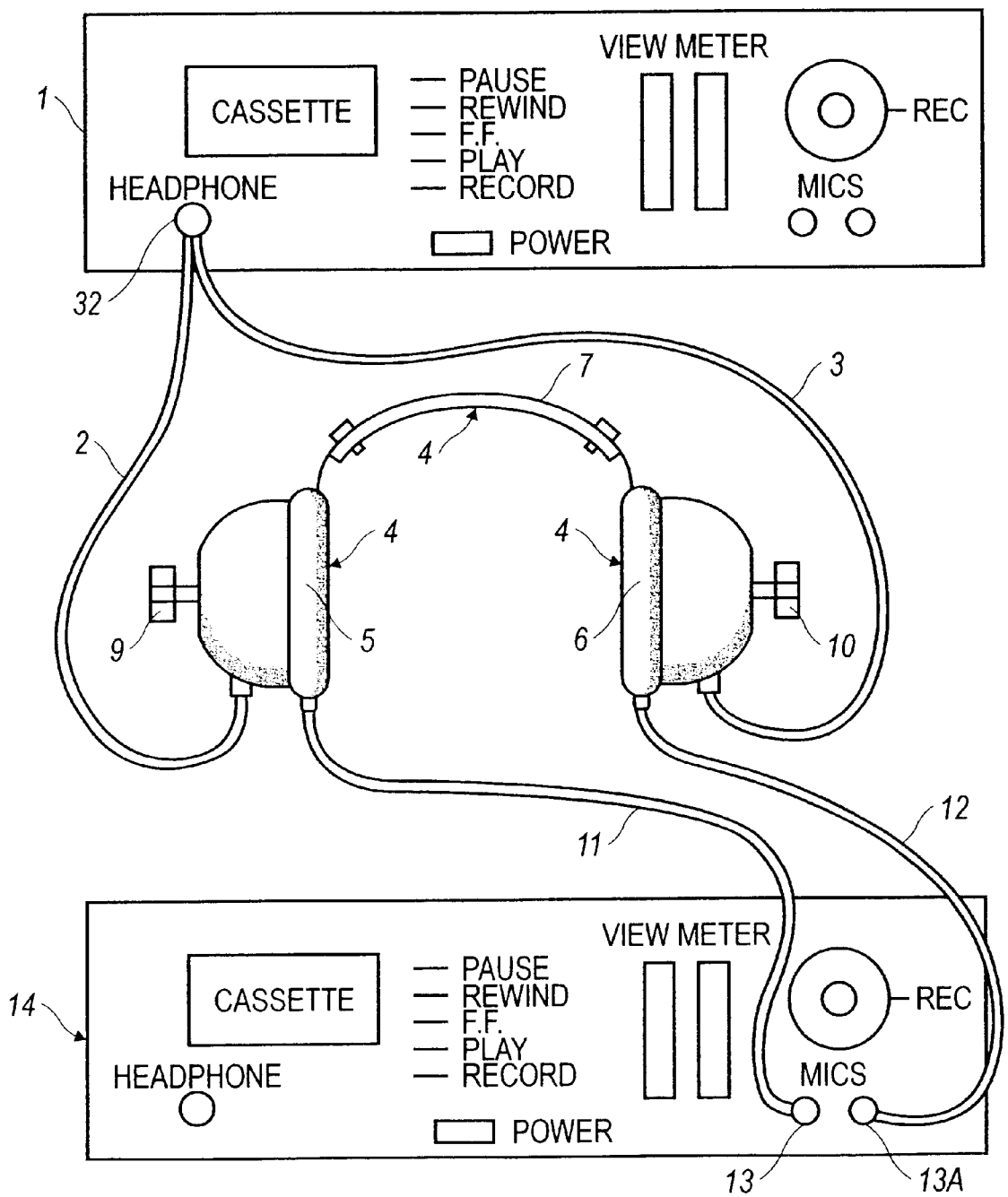
FIG. 1 shows a preferred embodiment of the system of this invention including headphones with adjustable potentiometers linked, on one end, to the headphone output means of a magnetic tape cassette record/playback device, and, at the other end to the microphone input of a similar device.

In FIG. 1, a conventional sonic signal record/playback device such as a cassette tape playback device is joined, via leads 2 and 3, to headphone set 4 comprising headphones 5 and 6 joined to one another by strap 7. Headphones 5 and 6 include adjustable potentiometers having rheostats 9 and 10. Headphone 6 and 7 are linked, via leads 11 and 12, to the microphone inputs 12 and 13 of sonic signal record/playback device 14.

Figure 2:
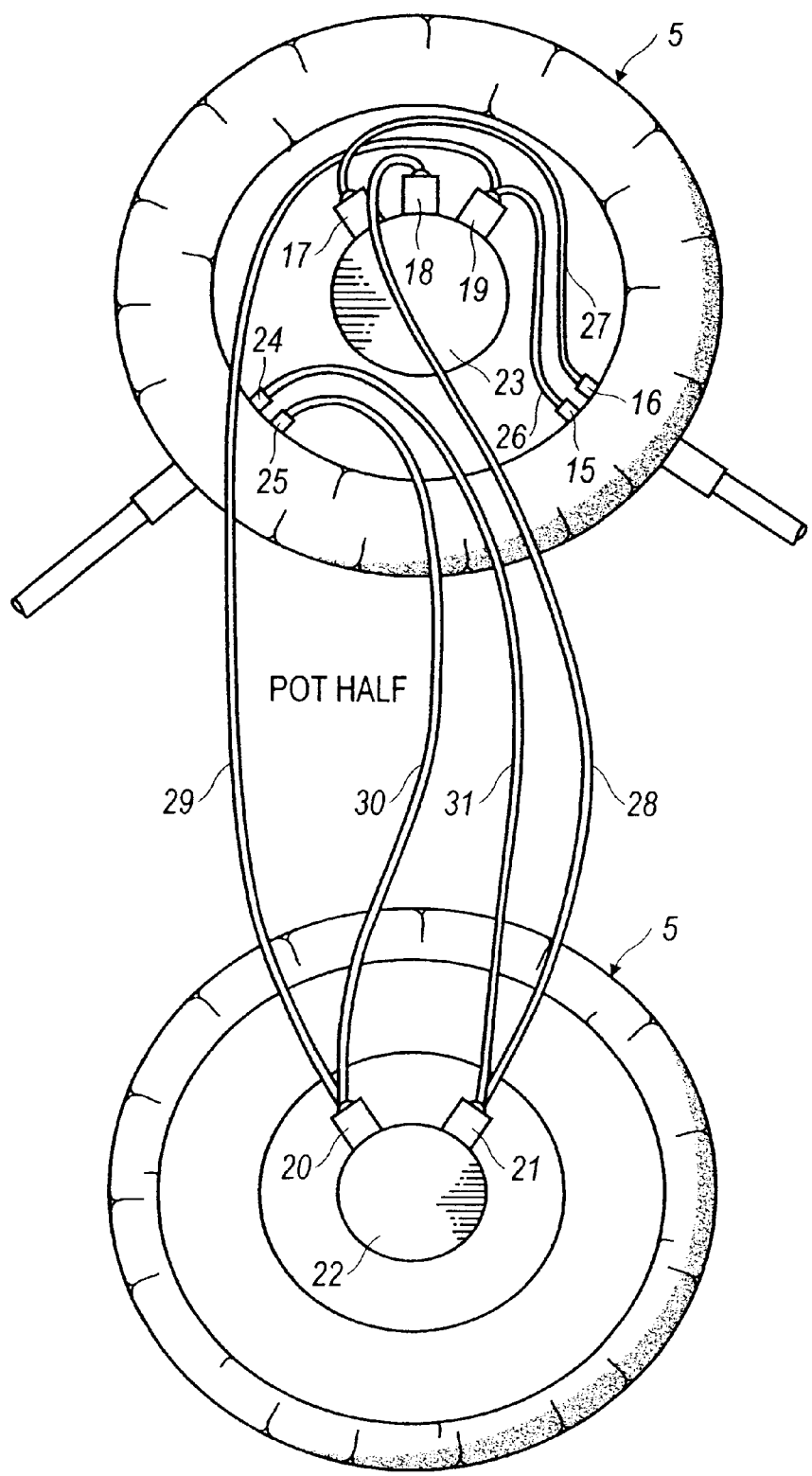
FIG. 2 shows the wiring inside the headphones depicted in FIG. 1.

FIG. 2 shows the wiring inside each of headphones 5 and 6. Headphone input terminals 15 and 16 are linked to terminals 17 and 19 of adjustable potentiometer 22 by leads 26 and 27. Potentiometer terminals 18 and 19 are linked to speaker input/output terminals 20 and 21 by leads 28 and 29. Speaker input/output terminals 20 and 21 are linked, in turn, to terminals 24 and 25, by leads 30 and 31 to feed signals to microphone inputs 12 and 13 of sonic signal record/playback device 14. If speaker 22 were not present, leads 28 and 29 would be wired directly to terminals 24 and 25. If necessary or desirable, the speakers can be replaced with one or more resistors.

Adjustment of potentiometer 23 by movement of rheostat 9 permits adjustment of the impedance offered to the sonic signals from headphone output terminal 32, thus permitting adjustment of the signal-to-noise ratio and improvement of the fidelity and quality of this signal. Although sonic signal transformation means are shown in FIGS. 1 and 2 as headphone external to record/playback device 1, such a system could be internal to tape record/playback device 1.

Figure 3:
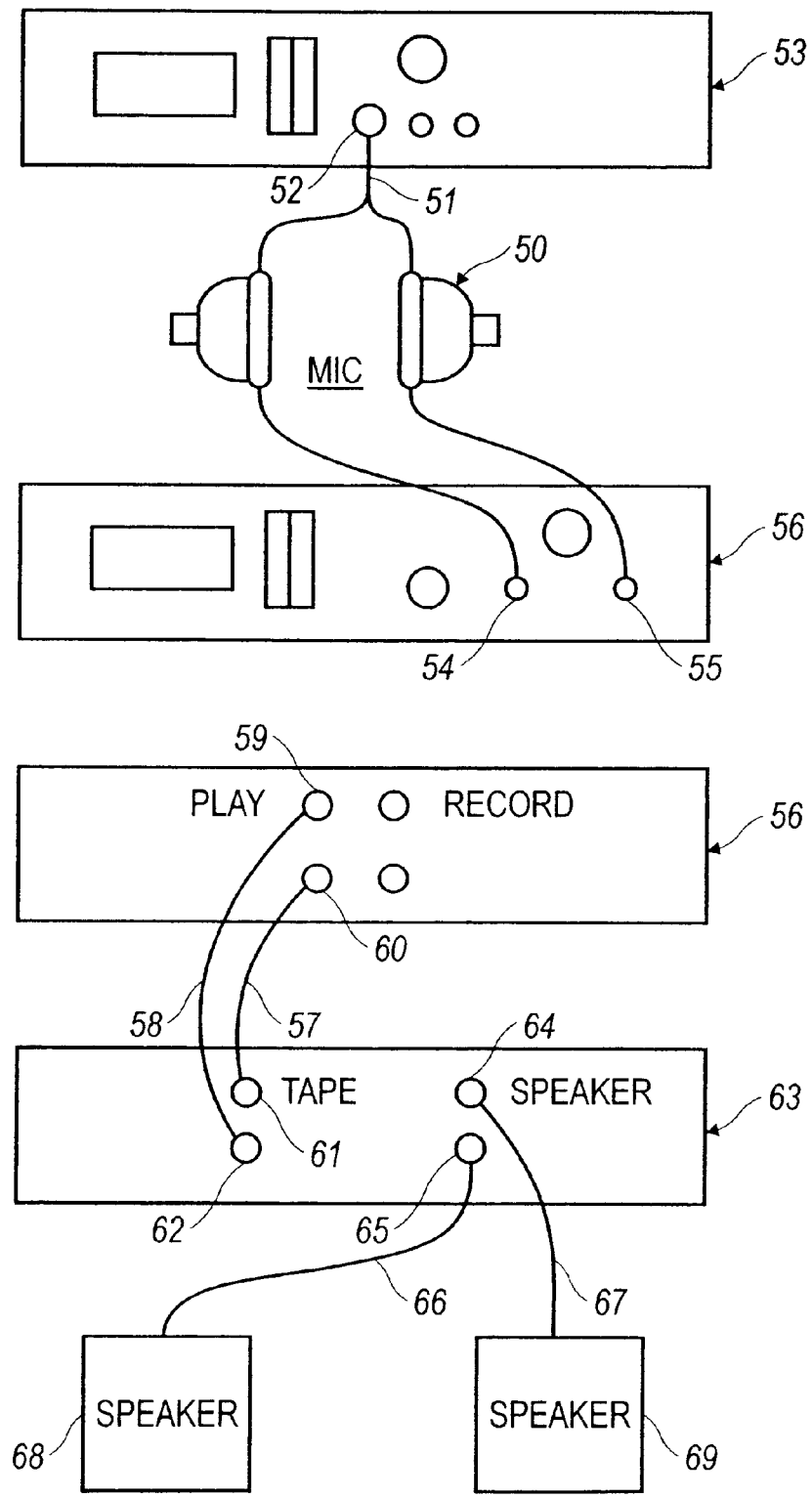
FIG. 3 shows a system for playback of recorded sonic signals with improved fidelity and quality and improved signal-to-noise ratio.

FIG. 3 shows a system for playback of a sonic signal from a first source without recording of the signal, but with improvement in its quality, fidelity, and signal-to-noise ratio. In this system, headphones 50 are linked by lead 51 to headphone output terminal 52 of sonic signal record/playback device 53 and, at their other end, to microphone inputs 54 and 55 of sonic signal record/playback device 56. In turn, the "play" terminals 59 and 60 at the back of the record/playback device 56 are linked, via 57 and 58, to the tape input terminals 61 and 62 of amplifier 63. The speaker terminals 64 and 65 of amplifier 63 are linked, by leads and 67, to conventional speakers 68 and 69. By proper adjustment, preferably a reduction of the signal output level from record/playback device 53, and by proper adjustment of the signal input at the microphone inputs of record/playback device 56, the signal-to-noise ratio, fidelity and quality of the signals originating at record/playback device 53 can be substantially improved.

Figure 4:
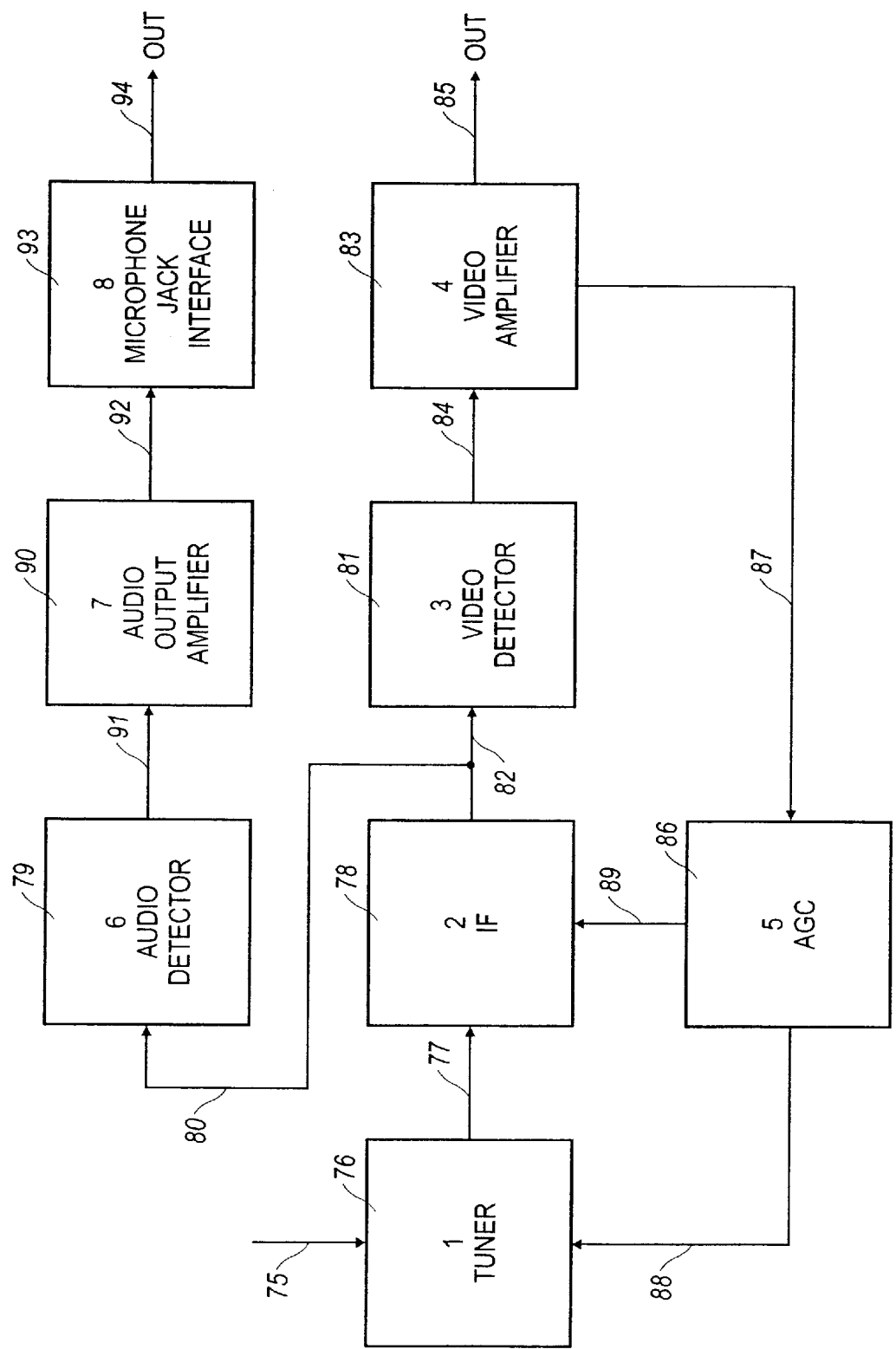
FIG. 4 is a block diagram of another embodiment of the system of this invention for transforming the audio portion of a television signal that includes both audio and video portions by means of a video cassette recorder.

FIG. 4 shows a system for recording a television signal by means of a video cassette recorder. The system includes means for transforming the audio portion (but not the video portion) of the television signal. The television signal enters the system on path 75, and passes into tuner 76 for channel selection. The signal then appears on path 77, and passes to intermediate frequency amplifier 78, which removes the carrier, if any, from the signal, and passes the audio portion of the signal to audio detector 79 and path 80 and the video portion of the signal to video detector 81 on path 82. The signal from the video detector 81 passes to low level video amplifier 83 on path 84. Low level amplifier 83 produces an output video signal on path 85 to the video cassette recorder and a signal for the automatic gain control circuit 86 on path 87 to establish proper gain control by means of signals passing to tuner 76 and interface 78 on paths 88 and 89, respectively.

The audio signal from intermediate amplifier 78 passes to audio detector 79 on path 80 and then to the audio output amplifier 90 on path 91. The audio signal emerging from audio output amplifier 90 passes on path 92 to output circuit 93, which, in turn, includes means for transforming the audio signal for delivery on path 94 to the microphone input jack of the video cassette recorder.

Figure 5:
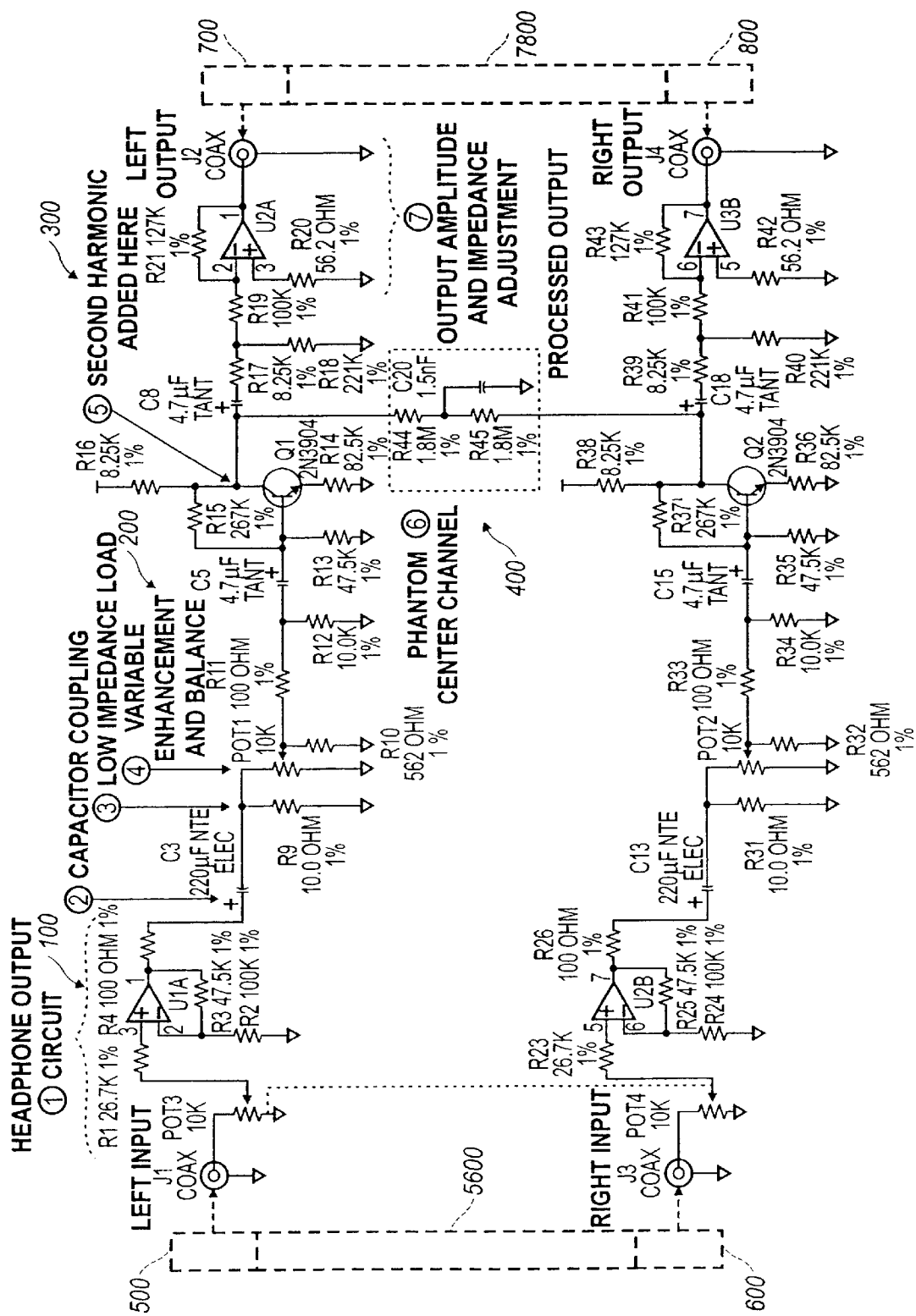
FIG. 5 is a schematic, illustrating the fundamental components of the invention.

In FIG. 5 there are shown the three fundamental components 100, 200 and 300 of the sound enhancing system, as applied to a system for reproducing stereo sound applied to left and right inputs and for reproduction following processing of the sound signals for delivery to appropriate playing or recording means at left and right outputs.

The first component 100 of the system comprises a circuit typical of headphone output circuits which produce signals of relatively low impedance but high signal power levels at the left and right inputs. Each of the input circuits is capacitor coupled to a low value resistance and due to sound order effect in the capacitor where high current is flowing, causes a reverberation effect when played through components 200 and 300 to a playback device.

At the second fundamental component 200 of the system, the left and right high level signals are variably adjustable by adjusting the potentiometer causing a low to relatively center the stereo signal image and control the creation of a second harmonic. In each side of the circuit a 10 ohm resistor has been selected and this resistor has the effect of drawing a large current through the capacitor and forming a low frequency corner, as signals are balanced and supplied to a circuit typical of low signal power level output circuit means 300, enabling the signal to be applied to microphone input circuit meters.

This is the third fundamental component 300 in each circuit and it is the pre-amp circuit. At each side of the circuit, this comparatively low signal power level circuit has means including means for causing and controlling the addition of a second harmonic to the processed signal in response to adjustment of the level of the relatively high signal power level supplied to the potentiometer since the transistor produces harmonic distorting diminishing with each higher harmonic.

In some circuits of the type herein described, the circuit components may cause some loss of signal separation due to proximity or otherwise. However, in this case, it is desired to cause a center channel effect at 400 by including a bidirectional low pass filter means below the two circuits.

The low level output circuit signals are at both the left and right outputs carried to appropriate amplitude adjusting means for playing or recording.

By enhancing certain aspects of a sonic signal, it can sound better than the original. This invention enhances, among other aspects, the ratio of second harmonic that is in phase with the fundamental. Once a certain percentage of second harmonics have been reached, a further addition in second harmonic content does not produce an additional improvement in sound quality and this invention controls the levels of addition.

Adding second harmonics to a sonic signal whose principle energy content is below 1500 Hz (which is the case for the preponderance of recorded music and spoken words) results in a signal whose perceived increase in volume is greater than a strict mathematical comparison of the original and enhanced versions would indicate. This is because the human ear has an increasing sensitivity to frequency from the lowest perceivable (say 20 Hz) up to approximately 3 kHz where it begins to decrease. This increase is approximately 6 dB per octave and this is believed to be the reason why the sonic signals that are processed by the method of this invention sound "sharper" and in better "focus" than the original.

The combination of resistors at component 200 that connect the output means of the first component 100 to the input means of the third component 300 function as an attenuator, so that the amount of desired attenuation is increased accordingly. The combination of resistors used in this invention supply on the order of 40 dB of attenuation, a ratio of 100 to 1 in voltage so that a wide range of possible input and output impedances is possible. Advantage is taken of this fact to provide a low impedance from the first circuit means 100 component and a medium impedance to the third circuit component 300.

The circuit shown in FIG. 5 produces the four effects that result from the use of the method taught herein as a result of the interaction or synergy between the components of the circuit. There may be others that occur and produce useful effects, but that remain unrecognized at this time.

The high current buffer is a circuit capable of putting an audio signal of nominally 1 Vrms into a low impedance (less than 100 ohms). This differentiates it from an ordinary line level buffer amplifier which is designed to only provide low current suitable for driving a high impedance load (greater than 600 ohms and usually 10 K ohms).

The capacitor coupling means in circuit 100 consists of a suitable type of capacitor, preferably an aluminum electrolytic type. This capacitor, when used for coupling in series with a low value resistor that provides a low frequency corner of nominally 12 Hz and when driven with high current (i.e. tens of mA), produces a second order nonlinearity that is referred to as "reverberation effect". The term reverberation effect is used because the effect on the sound is similar to an echo of short time delay or to reverberation.

The low impedance load means at 200 is preferably a 10 ohm resistor. The low value insures that the high current buffer will drive a relatively large current through the coupling capacitor means in order to produce the optimum reverberation effect.

The signal adjusting means, in the illustrated series circuit are used to achieve two things: 1) to control the amount of second harmonic energy added to the signal, and 2) to "center" the stereo image. The amount of second harmonic added to the signal varies directly with the amplitude of the signal driving the transistor amplifier stage shown in FIG. 5.

The two potentiometers are adjusted for the desired amount of enhancement and balanced so that the perceived center of the stereo image is half way between the speaker associated with the left and right outputs. Because the second harmonic added varies directly with to amplitude, and because of the psychoacoustic characteristics of the human ear, small changes in the difference of amplitude between left and right speakers produce a more exaggerated difference in the perceived position of the sound.

The second harmonic augmentation means at 300 consists of a single transistor amplifier so designed that it adds a small amount of second harmonic energy to a sine wave at the amplitude designated as maximum but limits addition of undesired third harmonic.

The phantom center channel means at 400 consist of R44, R45, and C20 as shown in FIG. 5. The generation of phantom center channel consists of mixing a portion of the left channel into the right channel and vice versa. This often occurs in stereo equipment not deliberately but as an undesired artifact of the particular circuitry and construction. This was the case of the equipment used in the preferred embodiment of the original application. Further research revealed that the mixing of left and right channel signals was due to two main sources: 1) a low frequency component due to decoupling circuit design and 2) a high frequency component due to the physical layout of the circuitry. It was discovered that a certain proportion of lower frequency (i.e., less than 1 KHz) mixing improved the subjective enjoyment of the effect, and that the high frequency component did not. Hence, in the preferred embodiment of the device shown in FIG. 5, the phantom center channel circuitry only couples the low frequency portion of the left and right channel signals to each other.

The signal output means is context specific. Depending on whether or not the amplitude of the signal appearing at the output of the single transistor amplifier is compatible with the level required by the follow stage of the specific application (i.e., VCR, stereo, telephone) an amplifier may be added to increase or decrease the level of the signal. Similarly, depending on whether or not the signal needs to be driven a long distance or driven through cables, an amplifier is added capable of driving the additional load presented by the cables with negligible distortion. The amplifier shown in FIG. 2 labeled "Output Amplitude and Impedance Adjustment" accomplishes both tasks.

The circuit shown in FIG. 5 is a preferred embodiment of the patent for a stereo application. It contains circuitry that reproduces each of the four distinct effects that occur to a sonic signal when a typical headphone type circuit output means is connected through a network of resistors to a typical microphone type circuit input means as taught herein.

A typical headphone output means can supply tens of milliamps of current and has a large aluminum electrolytic capacitor whose value is on the order of 220 uF. A typical microphone input means uses a single transistor amplifier. The circuit in FIG. 5 uses a single transistor amplifier typical of the type ordinarily used in a microphone input circuit.

The significance of "increasing, maintaining or decreasing" the impedance is twofold. By lowering the impedance to the sonic signals, more current is drawn through the coupling capacitor means in the headphone type output circuit means. This has been observed to increase the reverberation effect. By controlling the signal level to the microphone type input circuit it is possible to control the ratio of desired second harmonic to undesired third harmonic that is generated by the one transistor microphone preamplifier.

As indicated above, if desirable, the speakers of the headphone can be replaced with one or more resistors as seen in FIG. 5 by a 10 ohm fixed 10 K Ohm variable, and 560 Ohm fixed resistor combination cooperative with the capacitor. The 10 Ohm resistor in conjunction with the 220 uF capacitor forms a 12 Hz low frequency corner which optimizes the reverb effect.

Phasing, as used herein, refers to overall delay, delay at one frequency, relative delay between two channels, or delay between all fundamentals and their respective second harmonics. The potentiometer will increase the amount of second harmonics present that is in phase with their respective fundamentals.

It will be apparent that the circuitry of FIG. 5 may be readily incorporated in various devices for reproducing and enhancing sonic signals in which either a means for producing an analog sonic signal or for converting a digital signal to an analog sonic signal is associated with the left input, as indicated in 500, or with the input as indicated at 600. Also in certain applications means 5600 may be provided for coverting digital to analog signals supplied at both inputs simultaneously for purpose of production of stereophonic sounds. Similarly, at the outlet side, analog signals may be converted to digital signals at converters 700 or 800 at one of the outputs or by a means 7800 for analog to digital conversion of the stereophonic signals.

Therefore the circuitry of FIG. 5 is ideally suited for incorporation, say, in an analog cassette player or a digital compact disc player in which only the impedance adjustment may be made by external, manual adjustment. This produces a relatively compact and economically advantageous record player by incorporation of a circuit board and or chip construction containing the essential components 100, 200, 300, and 400.

The opposite sides of the circuitry in FIG. 5 may also be readily applied to telephone receiver/transmitter devices by employing one side of the circuit in the receiving side of the phone, and, if desired, applying the other side of the circuit to the transmitting side of the phone. In such case all of the advantages of signal enhancement, including the reverberation effect, and the second harmonic effect may be tuned as to the impedance either externally of the phone unit or at the phone factory under test conditions.

Other uses may include dual channel computer sound cards and other digital applications, broadcasting and the like.

I claim:

1. A system for reproducing stereo sound comprising:

at least a first and a second channel;

a circuit within each of the at least a first and second channels, wherein the circuit includes a capacitor and at least one resistor in series for causing a reverberation effect within at least a first and a second signal located within each of the at least a first and second channels, and a transistor amplifier for adjusting the at least a first and a second signals in the at least a first and second channels in order to generate a second harmonic; and a low pass filter located between the at least a first and second channels for creating a phantom center channel between the at least a first and second channels, wherein the low pass filter creates the phantom center channel by mixing a portion of the first signal with a portion of the second signal.

* * * * *